US006820696B2

(12) United States Patent
Bergman et al.

(10) Patent No.: US 6,820,696 B2
(45) Date of Patent: Nov. 23, 2004

(54) PETROLEUM PRODUCTION UTILIZING A SALT CAVERN

(75) Inventors: Gary J. Bergman, Fulshear, TX (US); William R. Landrum, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/132,037

(22) Filed: Apr. 25, 2002

(65) Prior Publication Data

US 2003/0201104 A1 Oct. 30, 2003

(51) Int. Cl.[7] .............................................. E21B 43/28
(52) U.S. Cl. .......................................... 166/369; 405/58
(58) Field of Search ............................... 166/369, 371; 405/55, 58, 59

(56) References Cited

U.S. PATENT DOCUMENTS

| | | | | |
|---|---|---|---|---|
| 3,066,732 A | | 12/1962 | McEver ...................... 166/266 |
| 3,759,574 A | * | 9/1973 | Beard ............................. 299/4 |
| 3,807,501 A | | 4/1974 | Kurtis et al. ................. 166/369 |
| 3,934,650 A | | 1/1976 | LaFortune ................... 166/267 |
| 4,016,930 A | | 4/1977 | Arnold ........................ 166/266 |
| 5,129,759 A | * | 7/1992 | Bishop ......................... 405/59 |
| 5,217,076 A | | 6/1993 | Masek ......................... 166/303 |
| 5,310,282 A | * | 5/1994 | Voskamp ..................... 405/58 |
| 5,431,482 A | * | 7/1995 | Russo ........................... 299/4 |
| 6,152,226 A | | 11/2000 | Talwani et al. .......... 166/252.4 |

FOREIGN PATENT DOCUMENTS

| | | |
|---|---|---|
| EP | 0 525 287 A1 | 2/1993 |
| WO | WO 00/36270 A1 | 6/2000 |

OTHER PUBLICATIONS

Thomas F. Barron, "Petroport: An Offshore Oil Port and Storage Facility for Texas ", *Solution Mining Research Institute*, Woodstock, Illinois, 1994, pp. 1–20.

Bruce E. Russell and William M. Bishop, "Petroport: New Concepts for An Offshore Texas Oil Port and Storage Facility", *Solution Mining Research Institute*, Woodstock, Illinois, Apr. 26, 1993, pp. 1–30.

Jack W. Gatewood, Michel Dussaud, Charles R. Chabannes, Jerome Jacquemont and Leny Cherouvrier, "Solution Mining and Storing Natural Gas Simultaneously–Operational Experience", *Solution Mining Research Institute*, Deerfield, Illinois, May 11–14, 1997, pp. 139–159.

T. J. Minihan and C. W. Querio, "Simultaneous Storage of LPG and Production of Brine, Pierce Junction Dome, Houston, TX", *Fourth International Symposium on Salt—Northern Ohio Geological Society*, 1973, pp. 285–290.

(List continued on next page.)

*Primary Examiner*—Zakiya Walker
(74) *Attorney, Agent, or Firm*—Sidley Austin Brown & Wood LLP

(57) ABSTRACT

A method and system for the combined underground storage and production of petroleum. A wellbore is drilled such that the surface is in fluid communication with an oil bearing and a salt bearing formation. Salt is leached from the salt bearing formation to form a cavern. The oil bearing formation is placed in condition for production. The pressure in the salt bearing formation is maintained below the pressure in the oil bearing formation and oil is collected in the cavern that was formed in the salt bearing formation. Periodically, oil is displaced from the cavern to the surface. The system includes a wellbore connecting the surface, an oil bearing formation and a cavern in fluid communication, a check valve is placed within the wellbore to permit the one way flow of oil from the oil bearing formation to the cavern. A wellhead tree seals the wellbore through which passes a conduit to inject gas into the wellbore. Also passing through the welltree is a conduit which extends into the cavern through which oil may be displaced. Oil is displaced from the cavern by injecting a fluid into the cavern to displace the oil. In off shore operations the system is especially useful to render wells with a low production rate economical to exploit.

15 Claims, 4 Drawing Sheets

OTHER PUBLICATIONS

B. Davidson, M. B. Dusseault and R. Demers, "Solution Cavern Placement of Solvay Process Solids—Development and Implementation of Cavern Placement Technology", El Paso, TX, *Solution Mining Research Institute*, Oct. 1997, 17 pgs.

J. L. Ratigan and T. J. Vogt, "LPG Storage at Mont Belvieu, Texas: A Case History", *SPE Advanced Technology Series*, vol. 1, No. 1, 1993, pp. 204–211.

Thomas F. Barron, "Regulatory, technical pressures prompt more U.S. salt–cavern gas storage", *OGJ Special*, Sep. 12, 1994, pp. 55–67.

Patrick de Laguerie and J. Gèrard Durup, "French gas–storage project nearing completion", *Oil & Gas Journal*, Dec. 12, 1994, pp. 35–42.

R. Kleinenberg, Natural Gas Underground Storage Project in Jebel Ali (Dubai—U.A.E.), Preliminary Study Report, *CONOCO*, Jun. 21, 1996 (29 pages).

N. Graeme Crossley, "Cavern Gas Storage–1, Downhole probes evaluate cavern integrity", *Oil & Gas Journal*, Mar. 3, 1997, pp. 74–80.

G. A. Knepper, "Underground Storage Operations", *JPT–Technology Today Series*, Oct. 1997, pp. 1112–1114,.

North Dayton Gas Storage Facility brochure, date unknown, 5 pages.

* cited by examiner

PETROLEUM PRODUCTION UTILIZING A SALT CAVERN

FIELD OF THE INVENTION

The present invention relates to the production of petroleum from a petroleum bearing formation and, in particular where the petroleum bearing formation is in fluid communication with a cavern in a salt bearing formation.

BACKGROUND OF THE INVENTION

The drilling of a petroleum producing well requires significant investment. As the demand for petroleum continues to increase and exploitable reserves increasingly are found offshore, there is a continuing need for the most efficient drilling and recovery of the petroleum. Further, there has been an emphasis on secondary recovery techniques to increase the amount of petroleum recovered from existing wells.

Underground caverns, such as those created in salt domes, have been used for the storage of hydrocarbons. Also, there has been suggested a combination of the secondary recovery technique of flooding with the use of a cavity below an oil bearing formation to gain advantages over flooding techniques which do not utilize the cavity. Such an approach is illustrated in U.S. Pat. No. 4,016,930. This technique is expensive, as it requires drilling of one or more secondary wells.

Recovery of petroleum from formations located below the surface of bodies of water such as rivers, lakes, and oceans involves many unique problems not encountered in land based exploration and recovery. Currently, offshore wells which would be considered successful wells if they were onshore, are not successful because of their location offshore. One significant difficulty in offshore production is the storage and transportation of the recovered oil. From many offshore locations building a pipeline to deliver the oil to the shore is not economically justifiable. Thus, produced oil must be transported by tanker to shore. A cost associated with offshore production is the cost of maintaining a tanker as a storage vessel on station to receive the petroleum. The rate of oil production from the well determines how long the tanker needs to stay on station. The cost of maintaining a tanker on station increases with each hour the tanker is present. Alternatively, the tanker travels a circuit loading oil from various wells. Additionally, the longer the tanker is present, the greater the risk that it will be exposed to foul weather not conducive to tanker loading operations. Thus, an offshore well that is in the primary production phase having a slow production rate that would be acceptable on land may be too slow to justify offshore tanker operations. For onshore production, the advantages of the invention include minimizing the requirements for surface storage of petroleum, and reduced potential for environmental hazards.

The present invention provides many advantages and features particularly useful in offshore production. Importantly, it has the advantage of making slow producing wells economically viable. The advantages of the present invention are that a single well is needed, a storage cavern is created which is in fluid communication with the well and the oil producing formation. The formed underground storage cavern eliminates the need for expensive surface storage and the risks associated with surface storage, as well as, the more economical employment of tankers offshore. Another advantage of the present invention is that flow rate can be adjusted so as to fill the cavern in a predetermined period of time. This allows for the efficient planning of tanker schedules. It also allows for the tanker to be filled in a minimum possible time. Another advantage of the present invention is that the creep closure rate of the cavern can be minimized.

BRIEF SUMMARY OF THE INVENTION

In one aspect, the present invention relates to a method of forming a storage cavern associated with a petroleum well. A storage cavern is formed by leaching salt from a salt bearing formation. The salt bearing formation may be located, above, below or beside the petroleum bearing formation. A bore hole is drilled into the petroleum bearing formation and the salt bearing formation without extracting oil from the oil bearing formation. The salt bearing formation is then leached to provide a cavern. Once the cavern is formed to the desired size, the petroleum bearing formation is placed in a condition for production of petroleum, for example, by perforating the casing located in the oil bearing formation. The pressure within the cavern is maintained below the pressure of the petroleum bearing formation, thus causing petroleum to flow from the petroleum bearing formation into the cavern.

In another aspect, the present invention relates to a method for the production of petroleum from the petroleum bearing formation, which involves connecting a cavern in a salt formation to a petroleum bearing formation and maintaining the pressure in the cavern at a predetermined pressure to cause a predetermined flow rate of petroleum from the formation into the cavern. Control of the flow rate can be utilized for coordinating the filling of the cavern with the scheduling of tankers to load the oil stored in the cavern.

Another aspect of the invention relates to a method for the production of petroleum from the petroleum bearing formation in which a single bore hole is drilled that connects the surface, the petroleum bearing formation and the salt bearing formation. Thereafter, the salt is leached from the salt bearing formation to form a cavern. The petroleum bearing formation is placed in condition to produce petroleum and the pressure in the cavern is maintained at a predetermined level to cause petroleum to flow into the cavern.

In yet another embodiment, the present invention relates to a system for producing oil. The system has a wellbore having an opening and which connects a petroleum bearing formation and a cavern. A check valve is placed within a passageway between the petroleum bearing formation and the cavern to allow oil to flow from the petroleum bearing formation into the cavern and prevent flow from the cavern to the petroleum bearing formation. A wellhead tree is provided proximate to the wellbore opening to seal off the wellbore while providing access for the passage of conduits through the wellhead tree. The system includes a displacement conduit for the injection or removal of displacement fluid, such as compressed air, nitrogen or water, into the cavern. A production conduit is also provided which passes through the wellhead tree and extends into the cavern for the removal of petroleum from the well. One or more valves can be located in the conduits to open and close the passageways.

BRIEF DESCRIPTION OF THE DRAWINGS

The preferred embodiments of the invention will be more readily understood with reference to the following drawings.

DETAILED DESCRIPTION OF THE INVENTION

Figure 1:
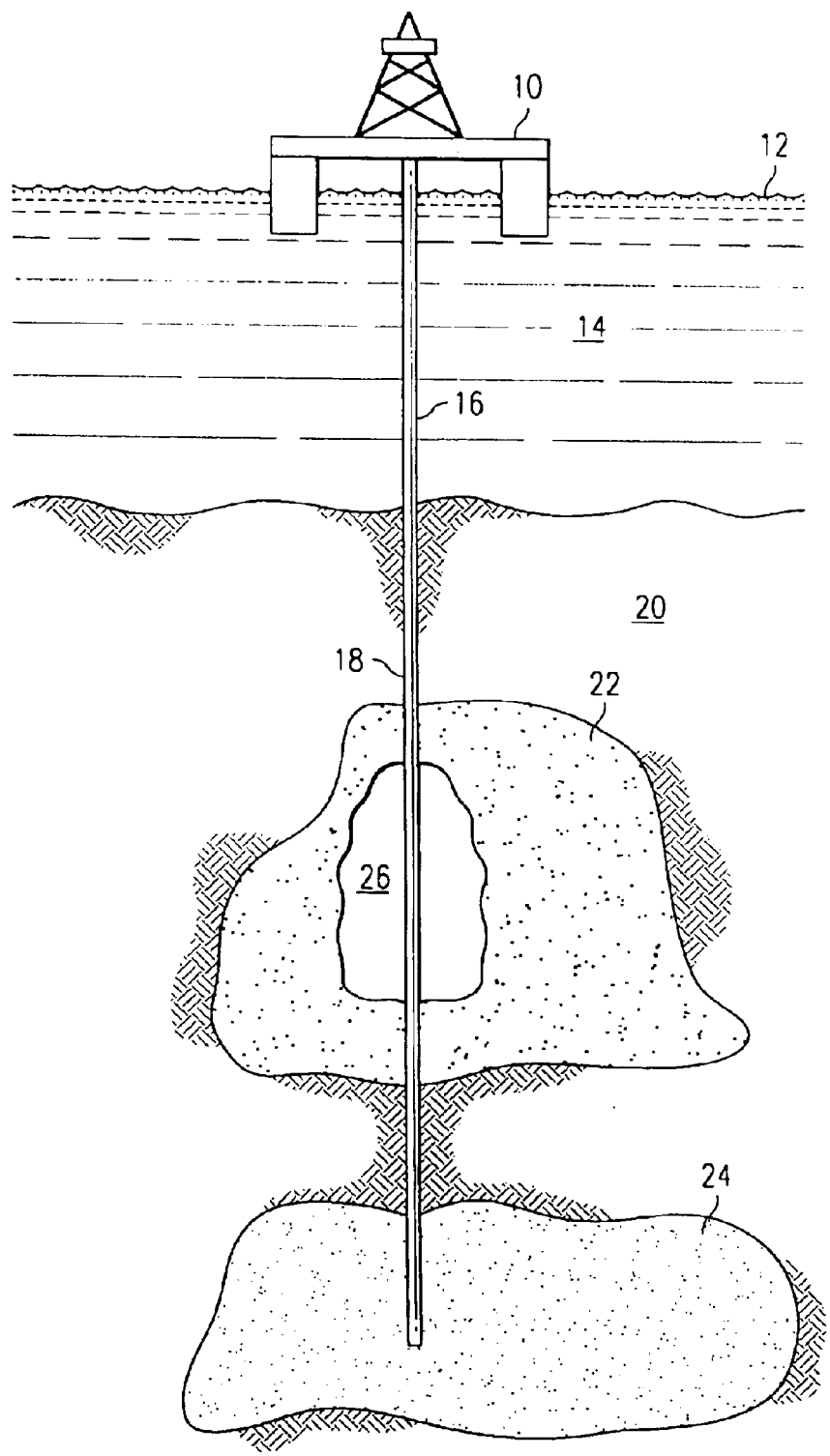
FIG. 1 is a partial cross sectional view of one method of the present invention.

FIG. 1 illustrates the present invention in an offshore drilling and production environment. It is to be understood that the invention can be applied to land based petroleum drilling and production. The invention is illustrated in reference to offshore operations where it is believed to have the most benefit. Drilling platform 10 is located on the surface 12 of the ocean 14. Extending from drilling platform 10 is drilling riser 16. Wellbore 18 is drilled into the earth 20. In the illustrations, the wellbore is shown as having a constant diameter. Those skilled in the art will understand that typically a wellbore will have sections of decreasing diameter the deeper the bore is. The wellbore 18 extends through a salt bearing formation 22, and then into a petroleum bearing formation 24. Wellbore 18 for simplicity is shown as a straight wellbore. Those skilled in the art will appreciate that the wellbore may be made utilizing directional drilling techniques which allow the course of the wellbore to be varied as desired. Wellbore 18 is constructed by known boring techniques. In the illustrated embodiment of FIG. 1, the wellbore first encounters the salt bearing formation. At a predetermined location within the salt bearing formation the drilling can be stopped, casing set and salt leached from the formation to form the cavern 26 having a desired volume. The leaching of salt caverns is done by solution mining techniques known in the art. Once a desired volume of cavern 26 has been established, the wellbore 18 is extended through the salt bearing formation 22 and into petroleum bearing formation 24. Once within the petroleum bearing formation 24, casing can be set and the formation prepared as needed to produce petroleum from the formation. This is done by known techniques. Petroleum from the petroleum bearing formation 24 is allowed to flow into cavern 26 by maintaining cavern 26 at a predetermined pressure below the pressure of the petroleum bearing formation 24. Typically, the pressure in petroleum bearing formation 24 will decrease as petroleum flows from the formation. The system for the displacement of oil from the cavern is discussed below.

Figure 2:
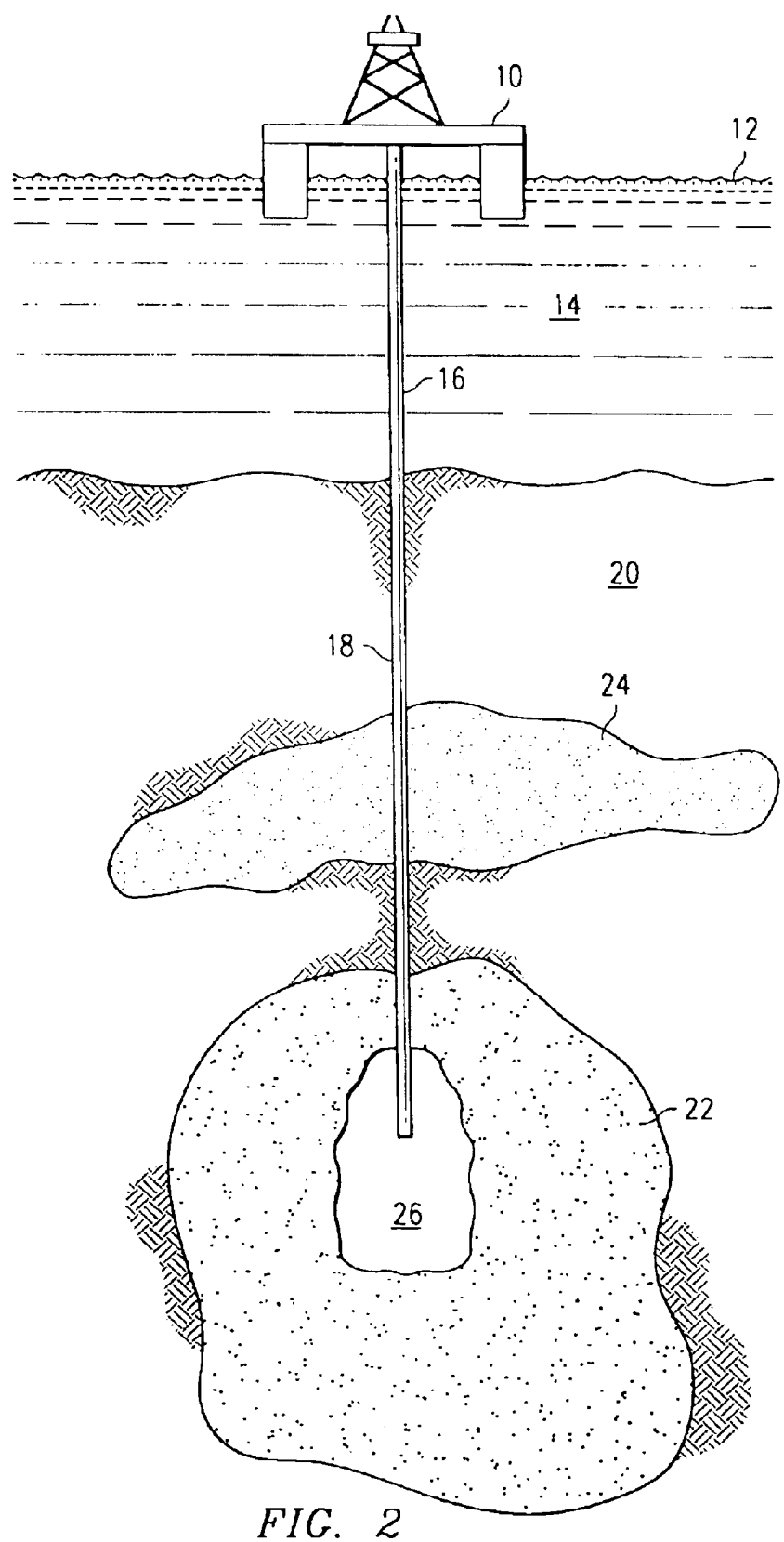
FIG. 2 is a partial cross sectional view of another method of the present invention.

FIG. 2 is another embodiment of the present invention. Like reference numbers in FIG. 2 correspond to reference numbers in FIG. 1. FIG. 2 illustrates the situation in which the petroleum bearing formation 24 is located above the salt bearing formation 22. One advantage of the present invention is that the salt bearing formation may be in any location relative to the petroleum bearing formation 24. The salt bearing formation may be above, below or to the side of the petroleum bearing formation 24. In the embodiment illustrated in FIG. 2, the wellbore 18 first penetrates petroleum bearing formation 24. Petroleum bearing formation 24 is not placed in condition for producing petroleum and the wellbore 18 is extended into salt bearing formation 22. Once the wellbore is at a predetermined location within salt bearing formation 22, casing is set and cavern 26 is formed by leaching salt from the salt bearing formation 22. Thereafter, petroleum bearing formation 24 is put into condition for producing petroleum. This may accomplished by known techniques such as perforating the casing contained in wellbore 18. The pressure in cavern 26 is maintained below that of the petroleum bearing formation 24 to cause petroleum to flow from petroleum formation 24 into cavern 26.

The volume of the cavern 26 can be selected such that the volume of the cavern 26 and the output rate of the petroleum reservoir facilitates loading of a tanker within a predetermined time frame.

Figure 3:
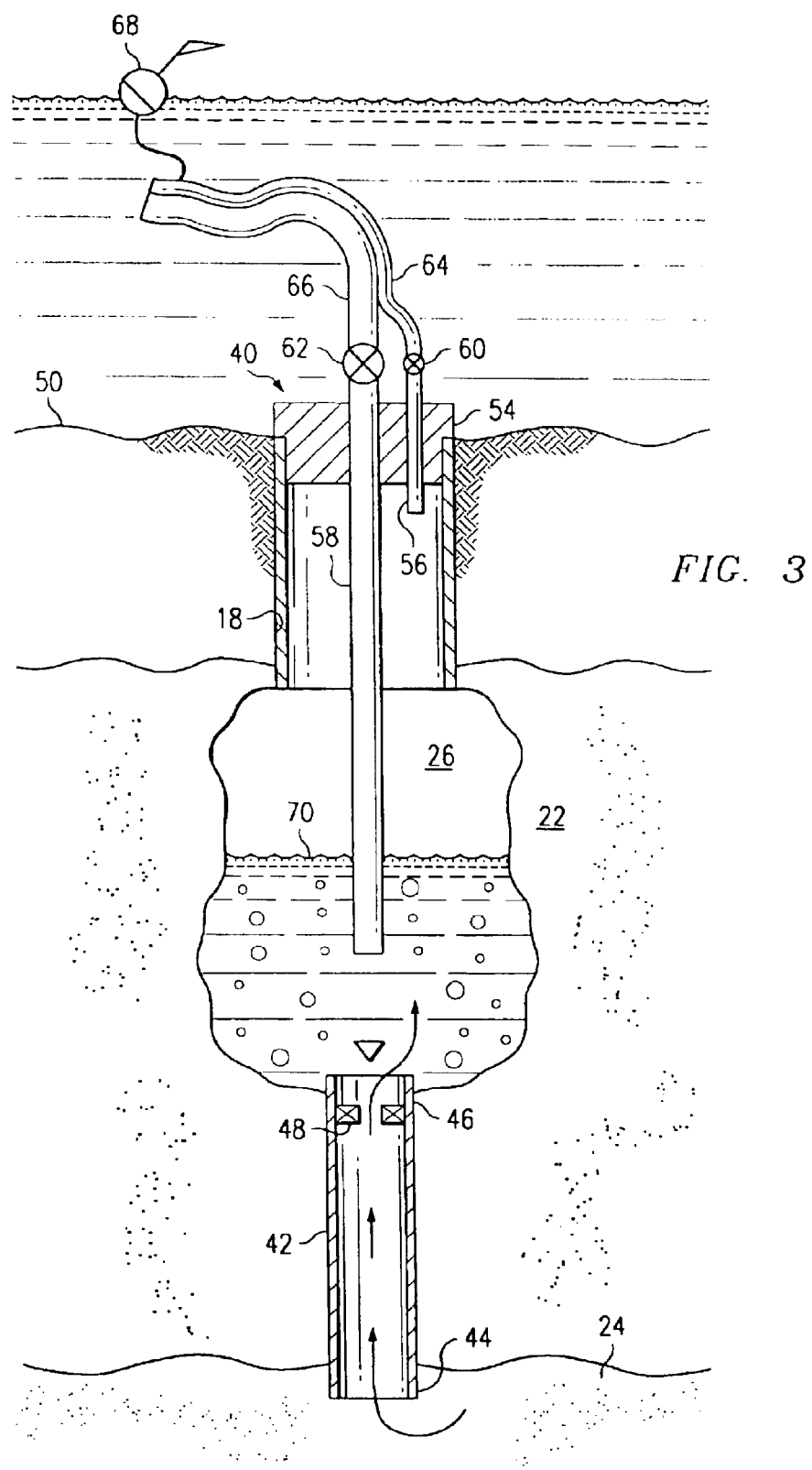
FIG. 3 is a cross sectional view of an embodiment of the invention where the salt cavern is located between the surface and the petroleum bearing formation.

FIG. 3 illustrates one embodiment of a production system when the salt cavern 26 is located between the opening of the wellbore 18 and the oil bearing formation 24. FIG. 3 exemplifies one construction of the production system, and other constructions can also be utilized. In this embodiment, petroleum bearing formation 24 is in fluid communication with cavern 26 by passageway 42, which is a portion of the wellbore. Passageway 42 can be formed from casing. The first end 44 of passageway 42 is located within the oil production zone of the petroleum bearing formation and provides an inlet for oil. Oil flows through the passageway and out the second end 46 of tubing 42 and into cavern 26. At a predetermined location along passageway 42 check valve assembly 48 is positioned. Check valve assembly 48 allows oil to flow from a petroleum bearing formation 24 into the cavern 26 and prevents the flow of oil 46 out of cavern 26 back into the petroleum bearing formation 24. The employment of the check valve prevents oil from flowing back to the formation during loading operations. The cavern 26 is connected to the earth's surface 50, which may be the seafloor or ground level, by the wellbore 18. Wellbore is used herein to refer to the bore hole as drilled, and also when the bore hole has been lined with casing and casing which extends above the opening of the bore hole. At the upper end of the wellbore 18 is positioned wellhead tree 54. The wellhead tree 54 seals the wellbore 18 and has passing through it a displacement conduit 56 and a production conduit 58. Displacement conduit 56 has positioned along its length at a predetermined location a displacement valve 60. Production conduit 58 has a production valve 62 located at a predetermined position along its length. Conduits 56 and 58 can be equipped with additional valves as required. In the illustrated embodiments of offshore oil production the system can include a displacement riser 64 connected to the displacement conduit 56. Production riser 66 is connected to production conduit 58. The upper end of the risers 64 and 66 can be connected to a buoy 66. Thus, the risers are allowed to float. A tanker arrives at the buoy 68, retrieves the upper ends of risers 64 and 66 and connects to them to begin loading operations. In a land based system the risers are not necessary.

In the production mode, oil flows into cavern 26 because cavern 26 is at a lower pressure than the pressure in the oil production zone of the petroleum bearing formation 24. Above the surface 70 of the oil can be gas such as air, nitrogen, or natural gas, etc.

To recover oil from the cavern 26, a fluid preferably compressed air or nitrogen is pumped through the displacement conduit 56 into the wellbore 18 and cavern 26 in causing the oil to be displaced through production conduit 58 through valve 62 out of the well. Once the desired amount of oil has been displaced from cavern 26, the air or nitrogen pressure is bled off through the displacement conduit 56 until the predetermined pressure is achieved to provide a predetermined differential pressure between the petroleum bearing formation 24 and the cavern 26. Once the desired pressure is reached the valve 60 is closed. The displacement fluid or a portion of the displacement fluid can be water. One benefit of using water as a displacement fluid, is that it can be used to further leach salt from the salt bearing formation. A pressure relief valve can be utilized as valve 60. The pressure relief valve can be set at a predetermined relief pressure. As oil flows into the cavern 26 and compresses the gas in the cavern 26, the pressure relief valve can release the pressure when it rises above the predetermined level, thereby maintaining a predetermined pressure differential between the cavern 26 and petroleum bearing formation 24.

Figure 4:
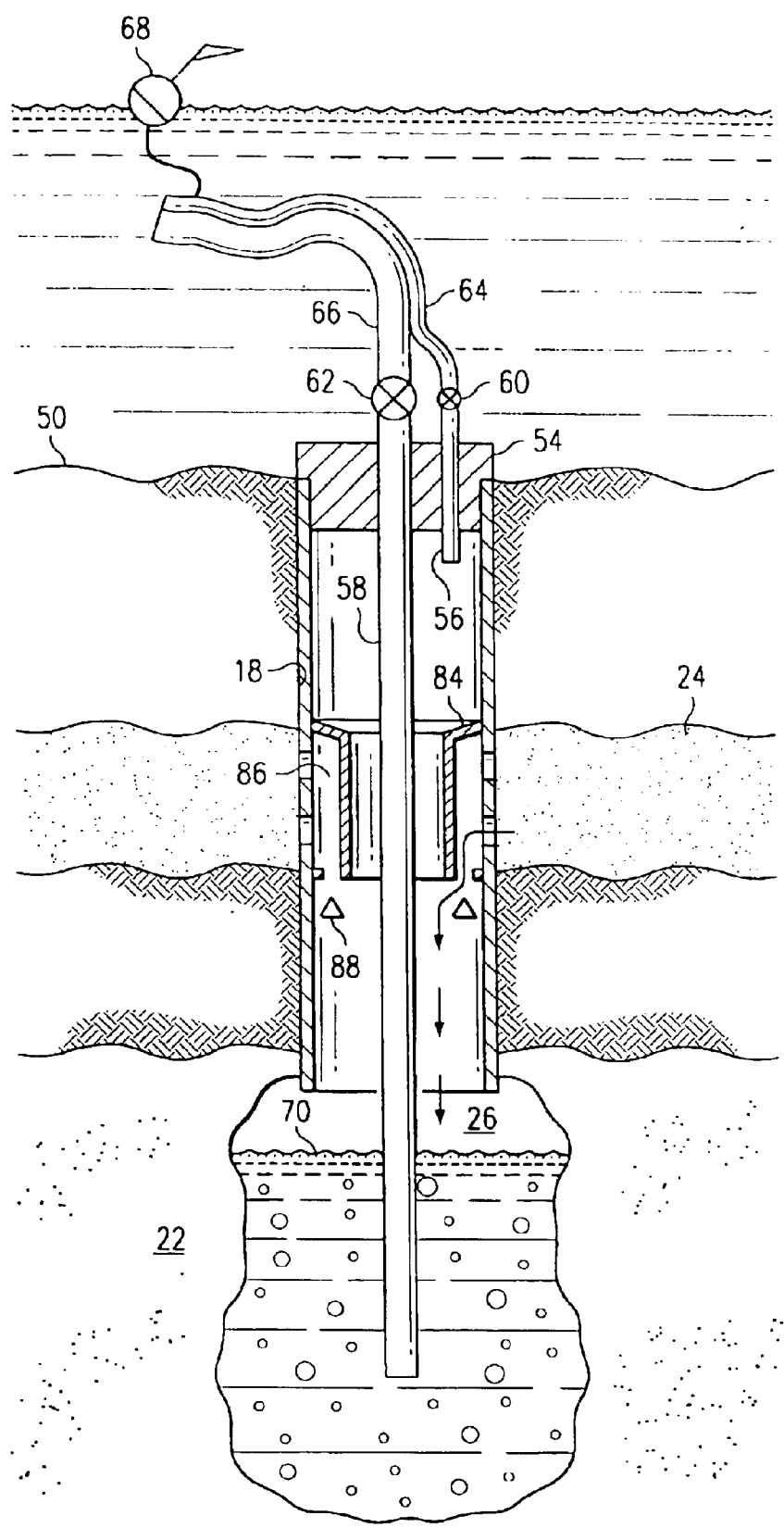
FIG. 4 is a cross sectional view of another embodiment of the invention where the petroleum bearing formation is between the surface outlet and the cavern in a salt formation.

FIG. 4 illustrates a production system where the petroleum bearing formation 24 is intermediate in the well between the opening at the subsea surface 50 and the cavern 26. Like numbers in FIG. 4 refer to like items in FIG. 3. In FIG. 4, the wellbore 18 extends from the sea floor 50 to the cavern 26. The opening of the wellbore 18 is sealed by wellhead tree 54. Across the production zone of the petroleum bearing formation 24, a packer or liner 84 is placed in order to control flow via check valve 88. The packer 84 may be an annular packer. The purpose of packer 84 is to form at least one passageway 86 for the flow of oil from the petroleum bearing formation 24 to the wellbore. Depending on the construction of the packer 84, multiple passageways could be provided. The passageway 86 has located within it check valve 88, which functions to permit oil to flow into the cavern 26 but not from the cavern to the petroleum bearing formation 24. Extraction of oil 46 is accomplished in the same manner as for FIG. 3. Pressure of the fluid over the surface 70 of the oil 46 is increased to displace the oil 46 up through the displacement conduit 58. Once the oil 46 has been displaced, the pressure in the wellbore 18 is bled off to a predetermined pressure such that a predetermined pressure deferential exists between the petroleum bearing formation 24 and the cavern 26, so as to cause oil through passageway 86 to flow into the cavern 26. The system operates in the same manner as that of FIG. 3.

The term passageway as used herein refers to the passageway which connects the oil bearing formation with the cavern. The passageway can be coincident with the wellbore as shown in FIG. 3, or formed by a packer or line or other device disposed in a portion of the wellbore as illustrated on FIG. 4.

The method of the present invention may also be used with an existing well. In an existing well, the petroleum bearing formation is preferably sealed from production. If the salt bearing formation is below or beside the petroleum bearing formation, the wellbore is extending by drilling to the salt bearing formation which is then leached to from a cavern as described herein. In the event the salt bearing formation is above the oil bearing formation, creating the cavern may be more difficult. In this circumstance, if casing has been set through the salt bearing formation, it would be necessary to remove a section of casing or to perforate the casing.

The pressure in cavern 26 can be controlled and varied utilizing one or more techniques. If very low cavern pressures are desired, propant can be placed to hold open the cavern to counter creep closure. Pressure can also be maintained and varied using hydrostatic pressure and/or pump pressure.

The length of time required to form cavern 26 is dependent upon a number of factors including the size of the wellbore and the tubing size it can accommodate. Also, other factors are the structure of the salt bearing formation, temperature, fluid used for leaching the salt, etc. It is estimated that a one billion barrel cavern could be formed in about four months at a leach rate of 2,500 gallons per minute. The following is an illustrative example of the advantages of the present invention. Petroleum is allowed to flow into the formed cavern. In the event the well has a production rate of 2,290 barrels per hour and the cavern had a drawn down rate of 20,000 barrels per hour, a 500,000 barrel shuttle tanker could be loaded at the well approximately every eight days. That is, a 500,000 barrel tanker could be loaded in approximately twenty-four hours. In this illustrative example, production rate would be about 55,000 barrels per day. In contrast, without the salt dome storage reservoir, it would require over 8 days to fill the shuttle tanker from the production rate of the well. The one million barrel cavern capacity in this projection would provide storage for eighteen days of production at a production rate of 55,000 barrels per day. Thus, the present invention allows the more economical deployment to shuttle tankers and in land based operations minimizes the need for large surface storage facilities.

It is known that salt cavern formations are subject to what is termed "creep closure". Creep closure is a tendency of salt caverns to slowly close. The closure rate is determined by many factors such as depth, pressure and temperature. Creep closure results in decreasing the size of the volume of the cavern. Creep closure can be lessened by use of a propant. Further, the present invention can utilize water to displace petroleum from the cavern. The seawater will leach additional salt from the cavern, thus, it can be used to maintain the size of the cavern by leaching additional salt to compensate for the effects of creep closure.

Another advantage is that the production rate can be controlled by controlling the pressure deferential between the cavern and the petroleum producing reservoir. In this manner, the filling rate of the reservoir can be timed to take into account scheduling of available tankers.

The scope of the present invention is not limited to the illustrated preferred embodiments, and many variations for different applications will be apparent to one skilled in the art.

What is claimed is:

1. A method for forming a storage cavern associated with a petroleum well comprising:
   a. drilling a borehole into a petroleum bearing formation having a production zone capable of producing petroleum;
   b. drilling said borehole into a salt bearing formation which is separate from said petroleum bearing formation such that a single wellbore connects said petroleum bearing formation and said salt bearing formation,
   c. leaching said salt bearing formation to form a cavern that is not in fluid communication with said production zone except through said borehole without the removal of oil from said oil bearing formation;
   d. placing said production zone in condition to produce petroleum; and
   e. maintaining the pressure within said cavern lower than the pressure within said petroleum bearing formations.

2. A method for production of petroleum from a petroleum bearing formation comprising:
   a. drilling a single wellbore which connects the surface, a petroleum bearing formation having a production zone capable of producing petroleum and a salt bearing formation which is separate from said production zone capable of producing petroleum;
   b. leaching salt from said salt bearing formation to form a cavern which is not in fluid communication with said production zone capable of producing oil except through said wellbore; and
   c. placing said production zone in condition to produce petroleum.

3. The method of claim 2 further comprising:

maintaining the pressure in said cavern at a predetermined pressure to cause a predetermined flow rate of petroleum from said petroleum bearing formation to said cavern.

4. A method of claim 2 further comprising:

periodically removing petroleum from said cavern.

5. A method for the production of petroleum from a petroleum bearing formation comprising:
   a. connecting a cavern in a salt bearing formation to a petroleum bearing formation which is a separate formation from the salt bearing formation by providing a conduit such that said cavern is not in fluid communication with said petroleum bearing formation except through said conduit; and
   b. maintaining the pressure in said cavern at a predetermined pressure to cause a predetermined flow rate of petroleum from said petroleum bearing formation to said cavern.

6. A method for the production of petroleum from a petroleum bearing formation comprising:
   a. drilling a wellbore which connects the surface and a salt bearing formation;
   b. leaching salt from said salt bearing formation to form a cavern;
   c. extending said wellbore into a petroleum bearing formation having a production zone capable of producing petroleum which is separate from said salt bearing formation; and
   d. placing said production zone in condition to produce petroleum.

7. The method of claim 6 further comprising:

maintaining the pressure in said cavern at a predetermined pressure to cause a predetermined flow rate of petroleum from said petroleum bearing formation to said cavern.

8. A system for producing oil from a formation comprising:
   a wellbore having an opening extending from the surface and in fluid communication with a cavern in a salt bearing formation and a production zone of a petroleum bearing formation which is separate from said salt bearing formation;
   a passageway connecting said cavern with said production zone of said petroleum bearing formation such that the said cavern and said production zone are in fluid communication only through said passageway;
   a wellhead tree positioned proximate said opening;
   a production conduit extending through said wellhead tree and into said wellbore for the removal of oil; and
   a displacement conduit extending through said wellhead tree and into said wellbore.

9. The system of claim 8 further comprising:

a cheek valve located within said passageway.

10. A system for producing oil comprising:
    a wellbore connecting the surface, an oil bearing formation, and a cavern in fluid communication, said wellbore having an opening at the surface;
    a check valve within the wellbore between said oil bearing formation and said cavern which prevents flow of oil from said oil bearing formation into said cavern and prevents flow from said cavern to said oil bearing formation;
    a wellhead tree proximate to said opening;
    a displacement conduit extending through said wellhead tree in fluid communication with said wellbore; and
    a production conduit extending through said wellhead tree and in fluid communication with said cavern.

11. A system of claim 10 further comprising:

a displacement valve positioned in said displacement conduit.

12. A system of claim 10 further comprising:

a production valve positioned in said production conduit.

13. A system of claim 11 further comprising:

a displacement valve positioned in said displacement conduit.

14. A system for producing oil from a formation comprising:
    a wellbore having an opening extending from the surface and in fluid communication with a cavern and a petroleum bearing formation;
    a passageway connecting said cavern with said petroleum bearing formation;
    a wellhead tree positioned proximate said opening;
    a production conduit extending through said wellhead tree and into said wellbore for the removal of oil;
    a check valve located within said passageway; and
    a displacement conduit extending through said wellhead tree and into said wellbore.

15. A system for producing oil from a formation comprising:
    a wellbore having an opening extending from the surface and in fluid communication with a cavern in a salt bearing formation and a petroleum bearing formation which is separate from said salt bearing formation;
    a passageway connecting said cavern with said petroleum bearing formation;
    a check valve located within said passageway;
    a wellhead tree positioned proximate said opening;
    a production conduit extending through said wellhead tree and into said wellbore for the removal of oil; and
    a displacement conduit extending through said well head tree and into said wellbore.

* * * * *

UNITED STATES PATENT AND TRADEMARK OFFICE
CERTIFICATE OF CORRECTION

PATENT NO. : 6,820,696 B2
DATED : November 23, 2004
INVENTOR(S) : Gary J. Bergman and William R. Landrum It is certified that error appears in the above-identified patent and that said Letters Patent is hereby corrected as shown below:

Column 8,
Line 2, please delete "cheek" and insert -- check --

Signed and Sealed this

Tenth Day of May, 2005

JON W. DUDAS
*Director of the United States Patent and Trademark Office*